3,265,657
PROCESS FOR GELLING AQUEOUS POLYVINYL ALCOHOL SOLUTIONS WITH CHROMIUM COMPOUNDS

Harold King Sinclair, Wilmington, Del., assignor to E. I. du Pont de Nemours and Company, Wilmington, Del., a corporation of Delaware.
No Drawing. Filed May 27, 1964, Ser. No. 370,721
5 Claims. (Cl. 260—29.6)

This invention relates to gelling agents for aqueous polyvinyl alcohol solutions, and more particularly to methods for the controlled gelation of aqueous polyvinyl alcohol solutions.

This application is a continuation-in-part of my copending application Serial No. 354,154, filed March 23, 1964, now abandoned.

Many methods for gelling aqueous polyvinyl alcohol solutions are known in the art. Many of these prior art gelling agents generally act instantaneously. That is, these compounds crosslink polyvinyl alcohol immediately upon contact therewith. Such prior art gelling agents are satisfactory where such instantaneous reaction can be tolerated, for example, in the application of such a gelling agent to the surface of a preformed polyvinyl alcohol film.

However, in many instances it is desired to first mix the gelling agent with the aqueous polyvinyl alcohol solution, then subject the solution to further treatment, and thereafter affect the gelation. For example, recently polyvinyl alcohol has been shown to be very useful in the preparation of very light weight foams suitable as insulating, acoustical, and packaging materials. In the preparation of such foams, it is necessary to first prepare an aqueous polyvinyl alcohol solution, to which is added a gelling agent which does not cause instantaneous gelation. Next, the foam is generated from the solution, which is then flowed through a hose or pipe to the position or place of application, whereafter it is essential that the polyvinyl alcohol foam immediately gel.

It will be recognized that the gelling agent must not cause any substantial gelation during the preparation of the polyvinyl alcohol solution or during the generation of foam. However, gelation must occur within seconds or at the most a few minutes after the foam is placed in final position. This is essential for at least one of four reasons: (1) to assure stability of foam structure regardless of how slowly drying occurs, which may require several days or even weeks; (2) to prevent drainage of substantial quantities of liquid to lower levels; (3) to prevent soaking of the foam liquid into porous building materials such as plasterboard, wallboard, electrical wiring, insulation, etc. and/or (4) to permit the foam to be placed in a vertical or largely unconfined position without running or falling out. A rapid change in the foam from a substantially liquid state to a gelled state is particularly essential for the last-mentioned characteristic. If the change from liquid to gel is not fast, the foam will not only adversely soak such porous materials, but also may break down in part and lose proper bonding of the foam to the building walls. However, as stated above, the gelling should not be completed until after the foam has been generated and flowed or placed in position because a foam in the fully gelled state is not readily flowed through pipes, hoses, orifices, nozzles, etc. without damage to the cellular structure. In contrast, a foam in which the liquid phase has not been gelled is readily hosed, piped, spread and flowed into position.

Consequently, the prior art gelling agents which cause instantaneous gelation cannot be used in such a method for foam preparation. Instead, it is necessary to use a method for controlled gelation. That is, a method whereby a gelling agent is added to an aqueous polyvinyl alcohol solution which does not cause instantaneous gelation but which causes rapid gelation after a desired time interval.

Other uses of aqueous polyvinyl alcohol solutions also require such controlled gelation methods. For example, in the application of coating compositions comprising aqueous polyvinyl alcohol solutions onto porous substrates such as paper or paperboard, it is desired to have a gelling agent incorporated into such composition which does not instantaneously gel the composition so that it may be conveniently applied onto the substrate but which will cause rapid gelation shortly thereafter to prevent the composition from soaking into the substrate.

An object of this invention is to provide an improved method for the gelation of aqueous polyvinyl alcohol solutions. Another object is to provide an improved method for the controlled gelation of aqueous polyvinyl alcohol solutions whereby a gelling agent is added to said solution which does not cause instantaneous gelation, but which causes rapid gelation after a desired time interval.

These and other objects are fully attained by the present invention which provides the process of gelling an aqueous polyvinyl alcohol solution comprising contacting in said solution, (1) a solution-soluble starting chromium compound wherein the valence state of the chromium is +6, and (2) a solution-soluble reducing reagent which converts said starting chromium compound into a gelation compound which supplies chromium ions having a valence state of +3 which crosslinks the polyvinyl alcohol, said reducing reagent being inert in said solution in the absence of said starting chromium compound. The reducing reagent should convert the starting compound into the gelation compound at a rate sufficiently slow that the starting compound and the redox reagent can be uniformly distributed through the solution before the onset of gelation, preferably within 5 to 500 seconds after the starting chromium compound and reducing reagent have been contacted in the solution.

The term "polyvinyl alcohol" refers to the water-soluble products obtained by the complete or partial alcoholysis or hydrolysis of polyvinyl esters such as polyvinyl acetate. Complete alcoholysis or hydrolysis indicates that 99–100% of the ester groups of the polyvinyl ester have been replaced by hydroxyl groups. Partial alcoholysis or hydrolysis indicates that 50–99% of the ester groups have been replaced by hydroxyl groups. A preferred polyvinyl alcohol is the commercially available, high molecular weight, fully hydrolyzed grade, having a 4% aqueous solution viscosity of 55–65 centipoises.

Chromium compounds wherein chromium has the valence state of +3 ($Cr^{III}$) have been used heretofore to crosslink polyvinyl alcohol, particularly at a basic pH. However, such $Cr^{III}$ compounds do not always effect the gelation of aqueous polyvinyl alcohol solutions, even at a basic pH. Moreover, the prior art provides no teaching of the use of any chromium compound to obtain the desired time controlled gelation of polyvinyl alcohol solutions as explained above. It has now been discovered that surprisingly when chromium ions having the valence state of +6 ($Cr^{VI}$) are reduced to $Cr^{III}$ ions, in an aqueous polyvinyl alcohol solution, the newly formed $Cr^{III}$ ions cause rapid crosslinking of the polyvinyl alcohol, preferably when the final solution has a pH of about 7 to 9, and provides the desired controlled gelation.

In the practice of this invention, a starting compound of chromium wherein the chromium is in the valence state of +6 (herein referred to as the "starting chromium compound"), is mixed into the aqueous solution of polyvinyl alcohol which is to be gelled. To insure intimate contact of this starting chromium compound throughout the polyvinyl alcohol solution, it is necessary for this compound to be solution-soluble, at least to the extent necessary to effect the subsequent gelation as explained below. That is, this starting chromium compound must be soluble in the particular aqueous polyvinyl alcohol solution which is to be gelled, which may also contain an acid or other ingredients. The terms "solution-soluble" and "soluble" as used herein in accordance with standard art-recognized terminology, refer to both true solutions and colloidal solutions, since the essential requirement is intimate contact throughout the polyvinyl alcohol solution, which may be accomplished by either a true solution or a colloidal solution.

A solution-soluble reducing reagent is mixed into the aqueous polyvinyl alcohol solution, which converts the aforedescribed starting chromium compound, by a redox reaction, into a gelation compound which supplies $Cr^{III}$ ions which in turn effects crosslinking of the polyvinyl alcohol. In most instances it is desired to select a reducing reagent which reacts relatively slow with the starting chromium compound to thereby permit the starting chromium compound and reducing reagent to be uniformly distributed through the solution before the onset of gelation. Selection of an appropriate reducing reagent is within the ordinary skill of practitioners of the art, and is simply a matter of choosing a reducing reagent of such known reactivity as will permit sufficient time for handling the fluid aqueous polyvinyl alcohol solution, as is required in any particular application, after the starting chromium compound and reducing reagent are contacted in the solution, but which will crosslink the polyvinyl alcohol to cause gelation within whatever time is desired.

Either the starting chromium compound or the reducing reagent may be added to the polyvinyl alcohol solution first, or the two may be added simultaneously, as may be desired.

Newly formed $Cr^{III}$ ions effect virtually instantaneous crosslinking of polyvinyl alcohol upon contact therewith. Therefore, as the reducing reagent begins to react with the starting chromium compound, the gelation proceeds very rapidly, resulting in firm polyvinyl alcohol gels shortly after the onset of gelation, even though the redox reaction is not completed. Consequently, this invention provides practitioners of the art with a surprisingly new technique for gelation of aqueous polyvinyl alcohol solutions which permits the gelation agents to be mixed into a polyvinyl alcohol solution which then remains completely fluid for sufficient time to permit flowing, spraying, doctoring, or otherwise applying the solution onto a surface, or generation of a foam which can then be flowed or otherwise placed into position, but which then is very rapidly converted into a firm gelled structure.

$Cr^{VI}$ compounds such as sodium chromate, sodium dichromate, potassium chromate, potassium dichromate, etc. may be used as the starting chromium compound to be contacted with a suitable reducing reagent, such as sodium bisulfite, sodium sulfide, sodium hyposulfite, sodium hydrosulfite, ethanethiolic acid, and the like, to generate $Cr^{III}$ ions. The choice of preferred reducing reagents is limited by the facts that $Cr^{VI}$ is a strong oxidizing agent only in acid solution and the crosslinking of polyvinyl alcohol by $Cr^{III}$ ions is most effective at a pH of less than 8. However, as the proper reducing agent is added the pH is automatically raised to an effective pH. Reducing reagents which supply bisulfite ions ($HSO_3^-$) are suitable for reducing dichromate ion ($Cr_2O_7^=$) compounds, and are preferably used in conjunction with copper ion catalysts such as cupric sulfate, cupric chloride, cupric acetate, cupric nitrate, and the like. Sulfide ion ($S^=$) compounds are also suitable reducing reagents for dichromates. Obviously, the reducing reagent must be essentially inert in the aqueous polyvinyl alcohol solution in the absence of the starting chromium compound. Otherwise, undesirable side-reactions may occur, and where the reducing agent is added to the solution before the starting chromium compound, the $Cr^{VI}$ compound most likely would not be reduced to generate the essential $Cr^{III}$ ions.

In the practice of this invention, the $Cr^{VI}$ compound should be added to the aqueous polyvinyl alcohol solution in an amount effective to cause the subsequent gelation of the solution after conversion (reduction) of the $Cr^{VI}$ compound to the $Cr^{III}$ compound. The precise lower limit of the concentration of the $Cr^{VI}$ compound depends primarily upon the particular type of polyvinyl alcohol used, the concentration of the polyvinyl alcohol in the aqueous solution, and the strength or firmness of the ultimate gel which is desired. Generally, the $Cr^{VI}$ compound must be used in an amount equivalent to at least about $3 \times 10^{-4}$ gram atom of chromium per gram of polyvinyl alcohol, and in most instances, it is preferred to use the $Cr^{VI}$ compound in an amount equivalent to at least about $5 \times 10^{-4}$ gram atoms of chromium per gram of polyvinyl alcohol. There is no actual critical upper limit on the concentration of the $Cr^{VI}$ compound. It should be noted that the strength of firmness of the gel is directly proportional to the amount of $Cr^{III}$ ions present which crosslinks the polyvinyl alcohol, and large excess amounts of the $Cr^{III}$ ions usually cause a shrinkage of the resulting gel which can squeeze water out of the gel. In many instances this result is immaterial, but where such a result is undesirable, the practitioner of the art may determine by routine experimentation, the operable upper concentration of the $Cr^{VI}$ compound to be added to the aqueous polyvinyl alcohol solution.

The amount of the reducing reagent to be added to the aqueous polyvinyl alcohol solution depends upon the concentration of the $Cr^{VI}$ compound used. In view of the many variables affecting the selection of the concentration of the $Cr^{VI}$ compound to be used in the solution, it is impossible to state precise limits on the amount of the reducing reagent to be added to the solution. However, a sufficient amount of the reducing agent should be contacted with the $Cr^{VI}$ compound in the aqueous polyvinyl alcohol solution to generate an amount of $Cr^{III}$ ions which is effective to gel the solution. Those skilled in the art will recognize that this amount of reducing reagent may be determined by routine experimentation.

This invention is further illustrated by the following examples. The mixing apparatus used in these examples consisted of two hypodermic syringes mounted adjacent to a vertical rod fitted with a sliding collar, arranged so that pressure on the collar forces liquids simultaneously from the syringes, and thence into a capillary T wherein the two liquids are mixed, and thence into a test tube. One of these syringes delivered two parts (by volume) of a polyvinyl alcohol solution and the other syringe delivered one part of a solution of an agent as indicated. The polyvinyl alcohol solution used in all examples was a 4.5 weight percent aqueous solution of a commercially available, high molecular weight, fully hydrolyzed polyvinyl alcohol having a 4% aqueous solution viscosity of 55–65 centipoises. In these examples, percentages are expressed in terms of percent by weight.

EXAMPLE 1

Two parts of a solution consisting of 10 ml. of polyvinyl alcohol solution, 0.5 ml. of 10% aqueous sodium bisulfite solution and 0.2 ml. of 2% aqueous cupric sulfate solution, were mixed with one part of 1% aqueous sodium chromate solution (to provide $7.35 \times 10^{-4}$ gram atoms of chromium per gram of polyvinyl alcohol). The bright yellow mixture was fluid for about one minute, whereupon it gelled to a firm, elastic gel. On standing, the gel became emerald green in color.

EXAMPLE 2

Two parts of a solution consisting of 10 ml. of polyvinyl alcohol solution, and 0.8 ml. of 5% aqueous sodium dichromate solution ($6.79 \times 10^{-4}$ gram atoms of chromium per gram of polyvinyl alcohol), were mixed with one part of 0.2% aqueous sodium sulfide solution. A bright yellow mixture was formed which was very fluid at mixing and formed a loose gel shortly thereafter. Within 15 minutes the mixture formed a firm elastic gel.

What is claimed is:

1. The process of preparing an aqueous polyvinyl alcohol composition, which remains fluid for at least a few seconds after preparation and spontaneously gels thereafter, which process comprises contacting a gellable fluid aqueous polyvinyl alcohol solution with a hexavalent chromium compound dissoluble therein to provide at least about $3 \times 10^{-4}$ gram atom of hexavalent chromium per gram of polyvinyl alcohol, and a reducing agent dissoluble therein in amount at least effective to reduce said amount of hexavalent chromium to trivalent chromium but ineffective alone to gel said polyvinyl alcohol solution.

2. Process according to claim 1 wherein the pH of said solution during contacting is less than 8 and the amount of said hexavalent chromium is at least about $5 \times 10^{-4}$ gram atom per gram of polyvinyl alcohol.

3. Process of claim 2 wherein said chromium compound provides dichromate ion and said reducing agent provides bisulfite ion.

4. Process of claim 3 wherein said compound and said reducing agent are contacted in the presence of copper ion.

5. Process of claim 2 wherein said chromium compound provides dichromate ion and said reducing agent provides sulfide ion.

References Cited by the Examiner

UNITED STATES PATENTS 2,125,374  8/1938  Herrmann et al. ____ 117—118
2,362,026  11/1944  Quist _____ 260—29.6

FOREIGN PATENTS 886,467  10/1943  France.

MURRAY TILLMAN, *Primary Examiner.*

W. J. BRIGGS, Sr., *Assistant Examiner.*